(No Model.) 5 Sheets—Sheet 1.
C. F. DANIELS.
ARMATURE FOR ELECTRIC MOTORS OR DYNAMOS.
No. 489,070. Patented Jan. 3, 1893.

Witnesses
Henry D. Williams
Thomas Foley

Inventor
Cornelius F. Daniels
By his Attorneys
Witter & Kenyon (No Model.) 5 Sheets—Sheet 2.
C. F. DANIELS.
ARMATURE FOR ELECTRIC MOTORS OR DYNAMOS.
No. 489,070. Patented Jan. 3, 1893.

Witnesses
Henry D. Williams
Thomas Foley

Inventor
Cornelius F. Daniels
By his Attorneys
Witter & Kenyon (No Model.) 5 Sheets—Sheet 3.
C. F. DANIELS.
ARMATURE FOR ELECTRIC MOTORS OR DYNAMOS.
No. 489,070. Patented Jan. 3, 1893.

WITNESSES:
Henry D. Williams
Thomas Foley

INVENTOR
Cornelius F. Daniels
BY
Witter & Kenyon
ATTORNEYS.

(No Model.) 5 Sheets—Sheet 4.

C. F. DANIELS.
ARMATURE FOR ELECTRIC MOTORS OR DYNAMOS.

No. 489,070. Patented Jan. 3, 1893.

WITNESSES:
Henry D. Williams
Thomas Foley.

INVENTOR
Cornelius F. Daniels
BY
Witter & Kenyon
ATTORNEYS.

THE NORRIS PETERS CO., PHOTO-LITHO., WASHINGTON, D. C.

(No Model.) 5 Sheets—Sheet 5.

C. F. DANIELS.
ARMATURE FOR ELECTRIC MOTORS OR DYNAMOS.

No. 489,070. Patented Jan. 3, 1893.

WITNESSES:
Henry D. Williams
Thomas Foley

INVENTOR
Cornelius F. Daniels
BY
Witter & Kenyon
ATTORNEYS.

UNITED STATES PATENT OFFICE.

CORNELIUS F. DANIELS, OF MACON, GEORGIA.

ARMATURE FOR ELECTRIC MOTORS OR DYNAMOS.

SPECIFICATION forming part of Letters Patent No. 489,070, dated January 3, 1893.

Application filed December 2, 1891. Serial No. 413,837. (No model.)

*To all whom it may concern:*

Be it known that I, CORNELIUS F. DANIELS, a citizen of the United States, residing at Macon, in the county of Bibb and State of Georgia, have invented certain new and useful Improvements in Armatures for Electric Motors or Dynamos, of which the following is a full, clear, and exact specification, reference being had to the accompanying drawings, forming part hereof.

The object of my invention is to produce an improved armature for an electric motor or dynamo electric machine of increased power and efficiency and of simple construction and capable of being easily taken apart and reconstructed or repaired, and it consists in the improved mechanism hereinafter described and claimed.

My invention is intended, preferably, to be used in connection with the other parts of a complete electric motor or dynamo invented by me, application for patents for which are made by me simultaneously herewith, the said applications bearing the serial numbers 413,838, 413,839, and 413,840 respectively. My invention may however, as is evident, be used with other magnets and parts of electric motors or dynamos.

Figure 1:
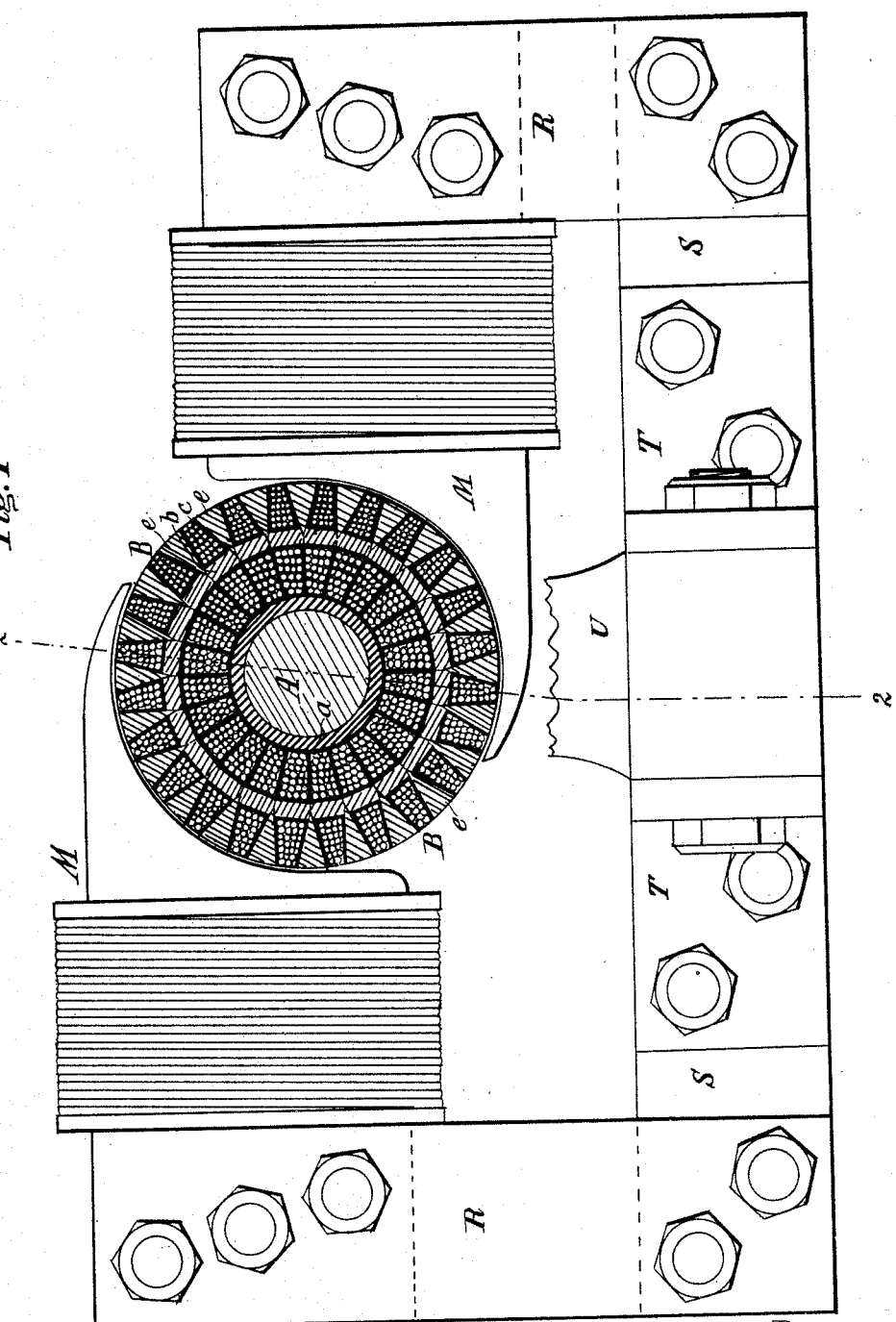
Figure 2:
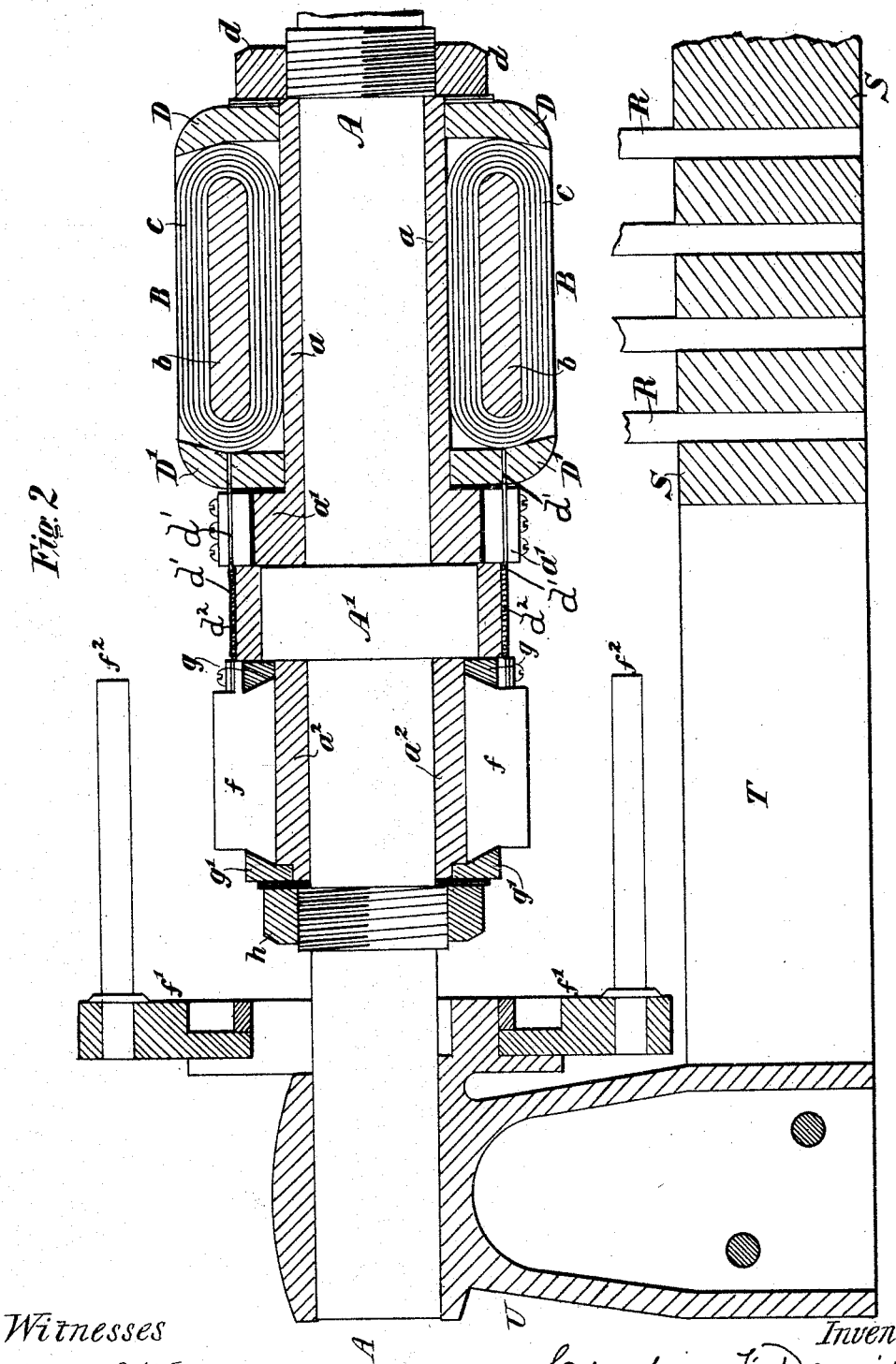
Figure 3:
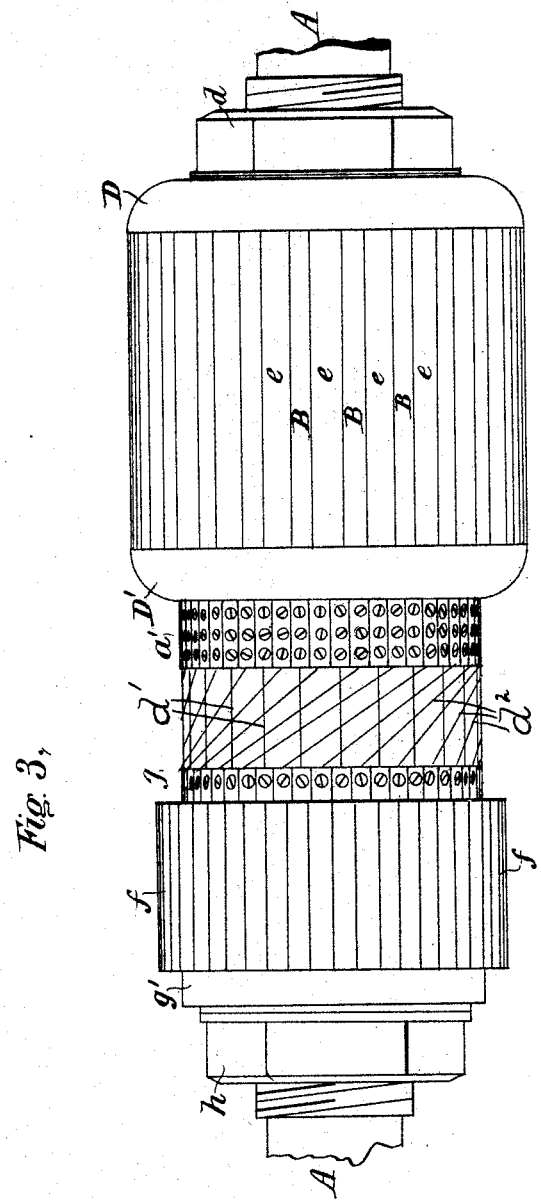
Figure 6:
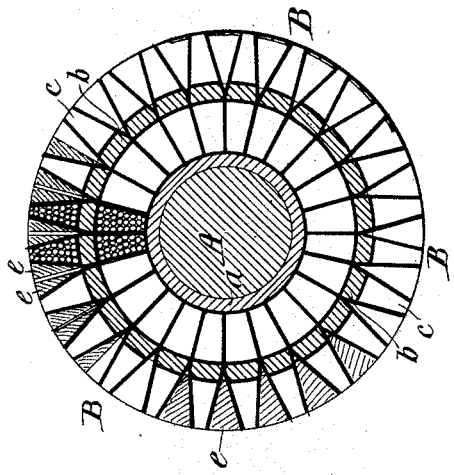
Figure 4:
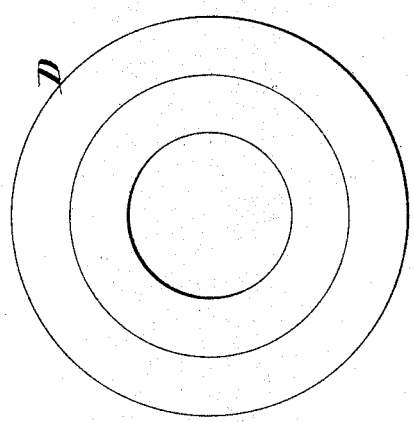
Figure 5:
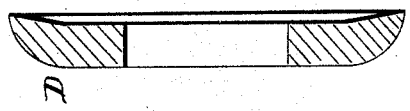
Figure 9:
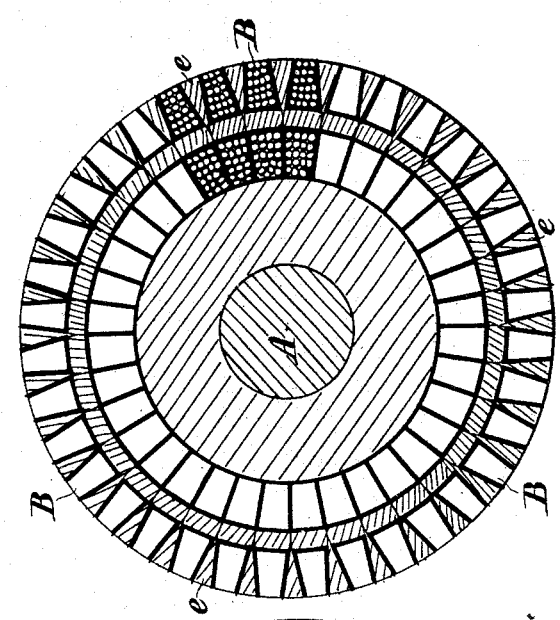
Figure 7:
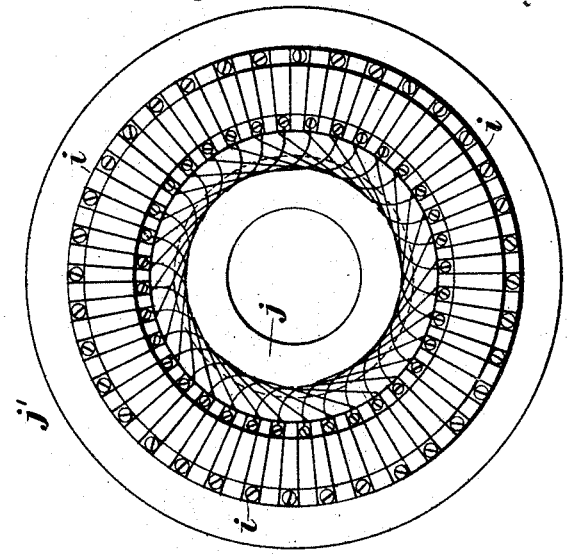
Figure 8:
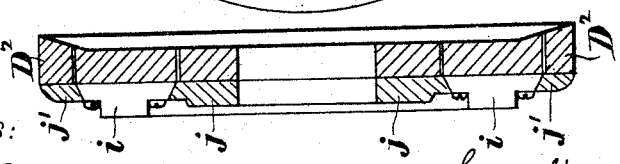

In the accompanying drawings Figure 1 is side elevation of a dynamo or motor provided with my improved armature, the armature being shown in section. Fig. 2 is a section of the same on the line 2—2, Fig. 1. Fig. 3 is a detached elevation of the armature and commutator. Fig. 4 is a face view and Fig. 5 is a section of one of the end pieces used to secure the bobbins in place. Fig. 6 is a transverse section of the armature showing several different means for holding the bobbins in place. Fig. 7 is a face elevation and Fig. 8 is a section of a modified combined end piece and commutator. Fig. 9 is a transverse section of the armature corresponding to the end piece and commutator of Figs. 7 and 8.

The various parts constituting my armature are secured upon the shaft or axis A. This shaft A has an enlargement or collar A' formed upon or secured to it, and has two enlarged and threaded portions, one on each side of the collar A'. The conducting coils of the armature are composed of several separate bobbins B, B, each of which has a core $b$, around which insulated conducting wire $c$ is wound. The core $b$ is made preferably of iron, solid or hollow; if hollow, I prefer to fill it with wire. The bobbins B are arranged in position around the armature shaft, a non-conducting sleeve $a$ being preferably interposed between the bobbins and the shaft. The bobbins completely fill the annular space about said sleeve $a$ except that their portions farthest from the center are slightly separated leaving wedge-shaped openings. The cores $b$ may be arranged all in magnetic contact one with the other as shown in Fig. 1, or may be divided into magnetically joined groups, or they may be slightly separated and insulated one from the other as shown in Fig. 6.

To hold the bobbins B in place I provide two suitable end pieces D D', mounted upon the sleeve $a$, which are arranged to press against the ends of the bobbins, and these end pieces are tightly clamped against the ends of the bobbins by a nut $d$ fitted upon one of the threaded enlargements of the shaft A, and tending to force the end pieces D, D', and intervening bobbins B against the collar A' of the armature shaft directly or against an intervening shoulder or enlargement $a'$ of the sleeve $a$, as shown in Fig. 1. The faces of the end pieces D D' that abut against the bobbins B have overhanging edges or rims or are dish shaped or concaved so that they firmly and securely clamp and hold the bobbins in place.

When my entire invention is used I also provide wedge shaped pieces $e$ $e$, fitting in the wedge shaped spaces between the bobbins and extending from one end piece to the other and fitting against the concaved faces of the end pieces. These wedge pieces $e$ $e$ press against the bobbins throughout their length, and, acting in combination with the end pieces that clamp the ends of the bobbins, securely hold the bobbins in place. These wedge pieces $e$ $e$ may be each made up of two pieces, as shown in Fig. 6 at the upper part of the armature, or of one piece as shown at the left hand side of the armature in Fig. 6. Or they may be omitted and the bobbins held in place only by the end pieces. Or instead of separate wedge pieces I may use wedge shaped projections from the faces of the end pieces D and D'. In the two constructions last mentioned the spaces between the bobbins may be covered by pieces of sheet metal or other substance as shown at the right hand side of Fig. 6. The bobbins are preferably laid lengthwise along the axis with the core parallel to it, so that the greatest wire surface will lie exposed to the field magnets. Both ends $d'$ and $d^2$ of the conducting wire wound on each bobbin pass to the commutator, one end $d'$ to the commutator plate directly in line with the bobbin and the other end $d^2$ to the commutator plate diametrically opposite the bobbin, consequently the first named wires lie practically straight, while the latter cross the collar A' diagonally, as will be seen by reference to Figs. 2 and 3. These commutator plates $f$ have dovetailed ends, and are mounted upon a sleeve $a^2$ of insulating material, which sleeve $a^2$ is mounted upon the armature shaft or axis A. The plates $f$ are also insulated one from the other in the usual manner.

Suitable end pieces $g$ and $g'$ hold the commutator plates in position, one of such end pieces, the end piece $g$, abutting against the collar A' on the armature shaft, and the other of such end pieces, the end piece $g'$, being tightly clamped against the commutator plates by the nut $h$ which is fitted upon one of the enlarged threaded portions of the armature shaft A.

The commutator brushes might be of any ordinary construction. The brushes are not shown in the drawings but I show an ordinary adjustable ring $f'$ provided with projecting pins $f^2$ which would hold the brushes.

The construction of field magnets and framework shown in the drawings is described and claimed in the other application filed by me under Serial No. 413,839, and are therefore not claimed or particularly described herein. The field magnets M are held by a framework R, S, and T, and the bearings U for the armature shaft A are also secured to this framework.

My improved armature possesses several advantages over armatures previously known or used; among others the ease with which it may be be taken apart and put together again. The bobbins can be removed and put back, or if damaged be replaced by new ones very readily and in a very short time. Another advantage is that the use of such bobbins in the construction of an armature permits an almost indefinite increase in the size of armatures; very large armatures can be used and be built up of bobbins either of the same size as those used in smaller armatures or of larger ones, as desired. The increased size of armatures results, of course, in increased leverage, it also enables the motor or dynamo to do the same amount of work with a decreased rate of revolution in the armature, thus decreasing the amount of gearing required to connect the motor or dynamo with more slowly rotating parts. In fact, if made of proper size, gearing might in some cases be entirely dispensed with.

When large armatures are used I sometimes arrange the commutator plates upon the face of a disk instead of upon the periphery of a cylinder, and utilize for this purpose the outer face of one of the end pieces of the armature. This construction is shown in Figs. 7, 8 and 9. The end piece $D^2$ is dish shaped or concaved on its inner face and clamps and holds the bobbins B in the manner already described.

Fig. 9 is a cross section showing the bobbins, sleeve and shaft of the armature of which $D^2$ is one of the end pieces. The outer face of this end piece $D^2$ is a flat surface, and upon this face are mounted the commutator plates $i$ with intervening insulating material. These plates $i$ fit at their inner ends against the ring $j$ secured to the outer face of the end piece $D^2$ and at their outer ends fit against the ring $j'$ also secured to the outer face of the end piece $D^2$, and the ends of the plates are dovetailed so that they will be tightly held in position by the rings $j$ and $j'$.

What I claim as new and desire to secure by Letters Patent is:—

1. In an electric motor or dynamo, an armature composed of separate bobbins wound with wire, each bobbin having a separate core, said bobbins surrounding the armature axis and secured thereto by end pieces and by wedge-shaped clamping pieces between the outer portions of the bobbins, substantially as set forth.

2. In an electric motor or dynamo, an armature composed of separate bobbins wound with wire, surrounding the armature axis and secured thereto by end pieces, a collar upon the armature axis, and means for clamping the same together, substantially as set forth.

3. In an electric motor or dynamo, an armature composed of separate bobbins arranged so as to surround the armature shaft and secured thereto by end pieces, a sleeve and a fixed collar upon said shaft, means for clamping said bobbins, end pieces and sleeve against one face of said collar,—a commutator made up of separate plates or sections and a sleeve surrounding said shaft, and means for clamping such commutator against the other face of the fixed collar on the armature shaft, substantially as set forth.

4. In an electric motor or dynamo, the armature composed of the bobbins B, the end pieces D D', the sleeve $a'$ and the clamping nut $d$, in combination with the armature axis A having collar A', substantially as set forth.

5. In an electric motor or dynamo, the armature composed of the bobbins B, the end pieces D D', the sleeve $a'$ and the clamping nut $d$, and the commutator composed of the plates $f$, the end pieces $g$, $g'$, the sleeve $a^2$ and the clamping nut $h$, in combination with the armature axis A having the collar A', substantially as set forth.

CORNELIUS F. DANIELS.

Witnesses:
HENRY D. WILLIAMS,
LEONARD E. WELCH, Jr.